United States Patent [19]
Trubey et al.

[11] Patent Number: 5,535,192
[45] Date of Patent: Jul. 9, 1996

[54] SERIAL NETWORK FAULT DETECTION, ISOLATION AND RESTORATIVE DEVICE

[75] Inventors: Bradley S. Trubey, Raleigh; Anthony D. Walker, Rougemont, both of N.C.

[73] Assignee: International Business Machines Corporation, Armonk, N.Y.

[21] Appl. No.: 381,695

[22] Filed: Jan. 31, 1995

[51] Int. Cl.$^6$ .................................................. H04J 3/14
[52] U.S. Cl. .................................. 370/16.1; 395/182.02
[58] Field of Search ........................... 370/16, 15, 16.1, 370/13, 17, 85.1, 85.4, 85.5, 85.6, 85.7, 85.8, 85.9, 85.12, 85.13, 85.15, 85.2, 85.3; 371/20.6; 395/182.01, 182.02, 182.03, 184.01, 185.01

[56] References Cited

U.S. PATENT DOCUMENTS

| | | | |
|---|---|---|---|
| 4,527,270 | 7/1985 | Sweeton | 370/16.1 |
| 5,105,188 | 4/1992 | Jung et al. | 370/16.1 |
| 5,132,962 | 7/1992 | Hobgood et al. | 370/16.1 |

*Primary Examiner*—Wellington Chin
*Assistant Examiner*—Huy D. Vu
*Attorney, Agent, or Firm*—Stephen T. Keohane; John B. Frisone; Joscelyn G. Cockburn

[57] ABSTRACT

A serial network fault isolation device for use in a network hub has receive and transmit buffers connected to the network. An isolation switch which allows the receive buffer to receive network signals while the transmit buffer sends signals such as media access control (MAC) frames supplied by the hub processor. A decoder connected to the receive buffer recognizes received (MAC) frames and interrupts the hub processor which reads the MAC frame. An idle character generator also under control of the hub processor is used to synchronize the circuit when the hub processor inserts the fault isolation device in the network.

5 Claims, 4 Drawing Sheets

SERIAL NETWORK FAULT DETECTION, ISOLATION AND RESTORATIVE DEVICE

This invention relates to serial communication networks in general and more particularly to a device adapted for connection to the network for monitoring the signals on the network and arranged to detect one or more unique signals defined in the network architecture each of which indicates the condition of network operation (such as normal, degraded, abnormal, . . . etc.). For making the detected signals available to a processor programmed to respond to said signals according to the defined network architecture. And in response to commands and signals supplied by the said programmed processor executing a specific data transmission routine for effecting restoration of network operation.

BACKGROUND

A major and well recognized drawback of serial communication networks such as the IEEE 802.5 Token Ring Network is the catastrophic network wide failure which takes place when any component in the network fails or some times worse still operates in degraded mode.

Much effort has gone into providing failure detection and network restoration devices and techniques. Many of these are identified in U.S. Pat. No. 5,132,962 issued Jul. 21, 1992 and assigned to the same assignee of this application. The device and the techniques disclosed in the 962 patent have proven very effective in detecting, isolating and restoring network operation.

Attempts have been made to simplify and or otherwise reduce the cost of the network. The instant invention resulted from one such attempt. It has due to its unique circuit design resulted in a substantial cost reduction over known existing designs and at the same time retained all of the essential performance requirements.

SUMMARY OF THE INVENTION

The invention contemplates an application specific integrated circuit (ASIC) adapted for connection to a serial network and for monitoring the transmissions thereon and for detecting at least one media access control (MAC) frame. For supplying the said detected at least one MAC frame to a programmed processor. For receiving from the programmed processor a message and transmitting the message on to the network under control of the programmed processor.

DETAILED DESCRIPTION OF THE INVENTION

Figure 1:
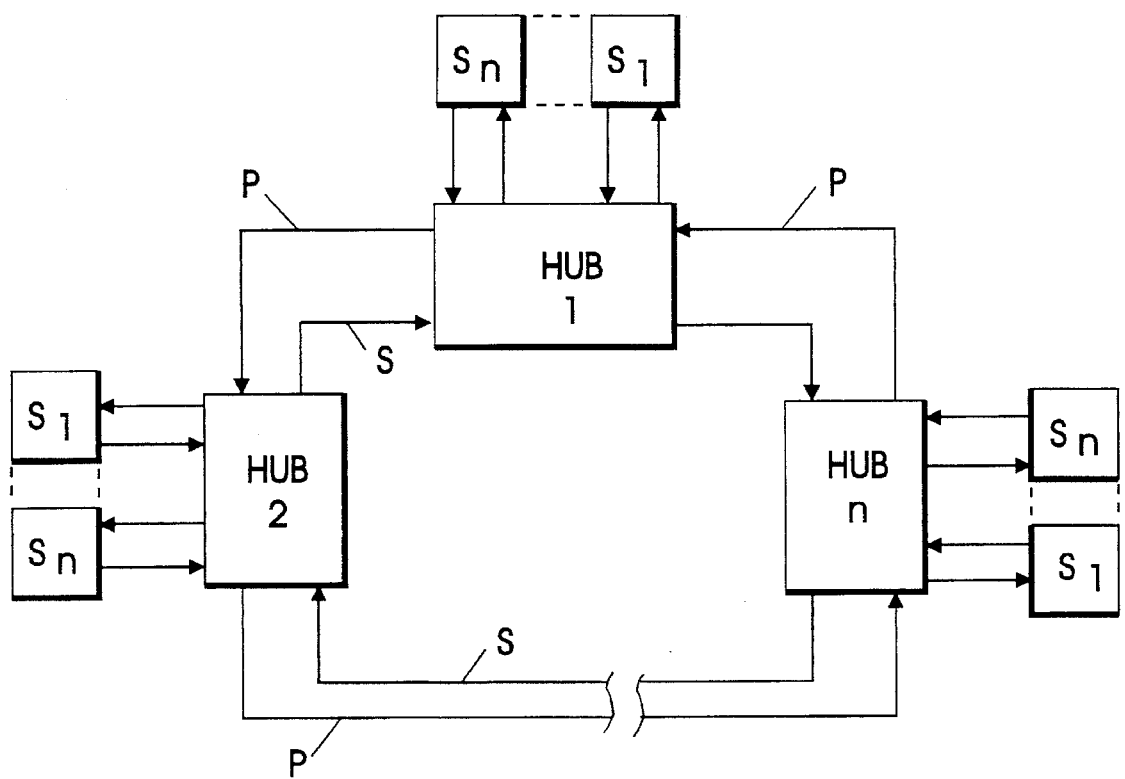
FIG. 1 is a block diagram of a token ring network including a plurality of hubs for connecting a plurality of stations to a token ring via a plurality of ports associated with each hub.
Figure 2A:
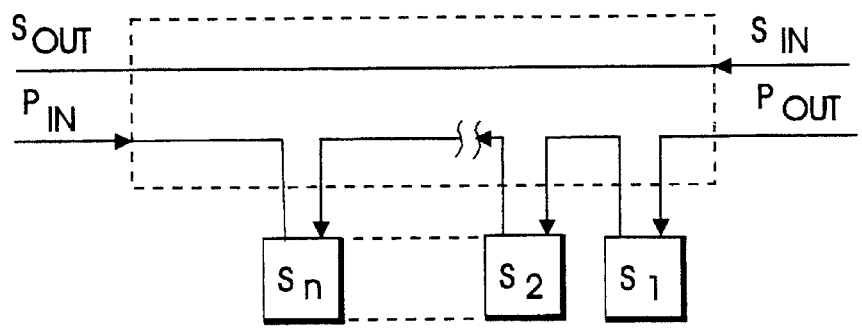
FIG. 2 is a block diagram of four views A,B,C and D illustrating switching states which a hub may assume depending on different states of operation of the ring.
Figure 2B:
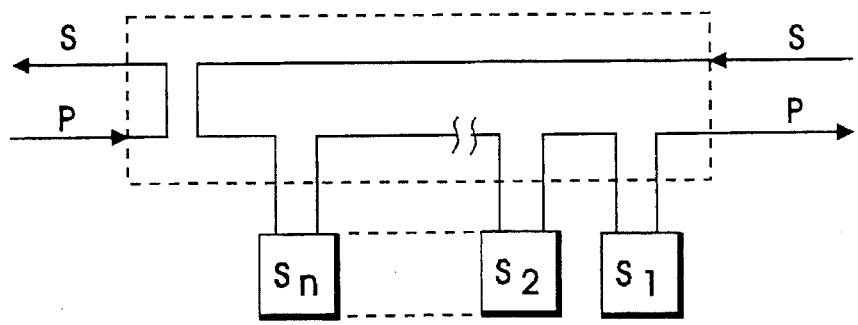
Figure 2C:
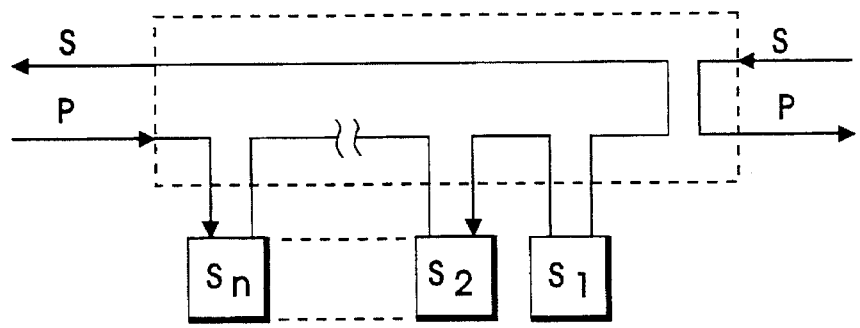
Figure 2D:
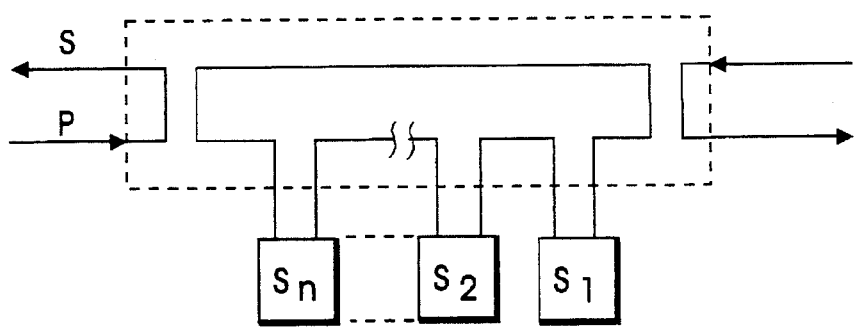
Figure 3A:
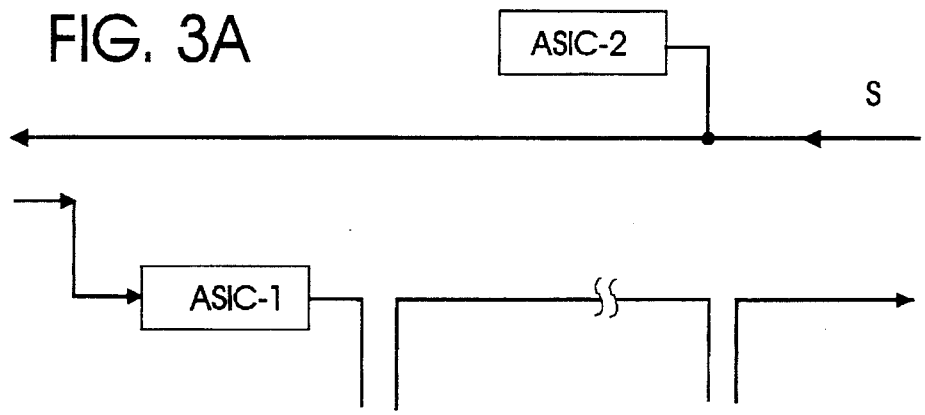
FIG. 3 is a block diagram similar to FIG. 2 and includes four views A,B,C and D which illustrate the connection of two ASIC devices in the rings for detecting media access control (MAC) frames and transmitting beacon frames under control of the hub processor;and, FIG. 4 is a block diagram of the ASIC device constructed according to the invention and it' connection to the token ring in the ring switching state illustrated in view D of FIG. 2 and the programmed hub processor which executes the architected ring recovery procedures when the ring is in that switching state.
Figure 3B:
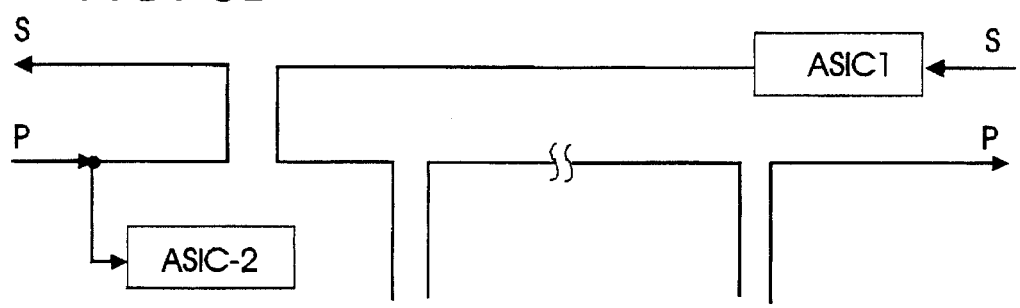
Figure 3C:
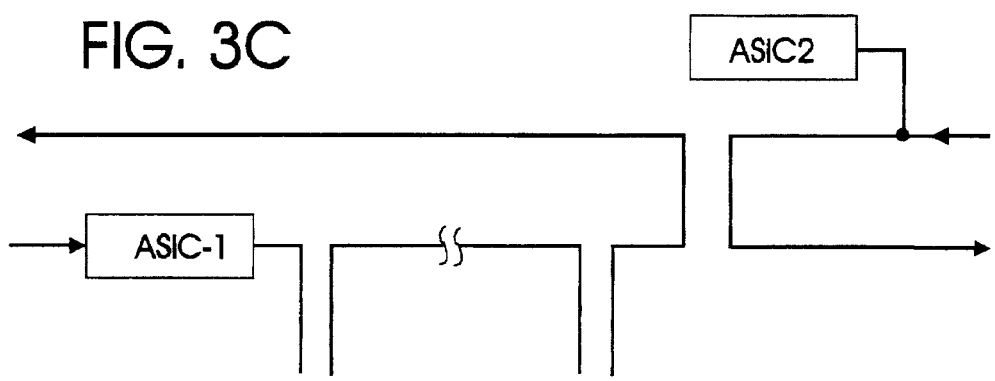
Figure 3D:
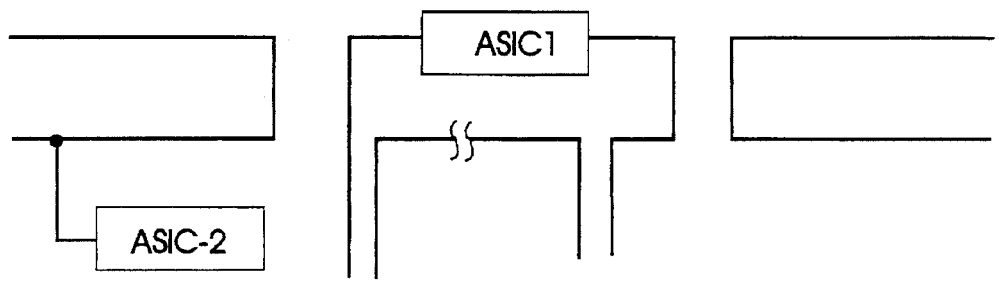

In FIG. 1 n hubs each having n ports suitable for connecting at least n station in series circuit are connected in a dual ring configuration by primary ring segments P in a primary ring and by secondary ring segments S in a secondary ring which under normal ring operation is not connected to the primary ring. During normal ring operation the stations connected to the hub ports are connected in a series ring circuit. No stations are connected in the secondary ring. However, signals, if any, on the secondary ring can be monitored at each hub which can take corrective action including ring reconfiguration in appropriate instances.

The four views (A,B,C and D) in FIG. 2 illustrate four ring configurations at a hub which includes n ports with up to n or more stations connected thereto. View A illustrates a normal no fault configuration in which all of the stations connected to the ports are connected in series circuit between the primary ring in of the hub and the primary ring out of the hub.

In view B the primary and secondary rings have been reconfigured into a single ring to bypass a ring fault upstream on the primary ring and external to the hub illustrated. View C is similar to View B described above, however, in this instance the ring fault is down stream with respect to the primary ring and external to the hub illustrated. View D illustrates the situation in which the fault has been isolated between the primary ring in and ring out of the illustrated hub. In this case all of the stations connected to the hub ports are included in an isolated ring and the secondary and primary ring in and ring out are wrapped to form single ring which does not include any of the stations connected to the illustrated hub.

Figure 4:
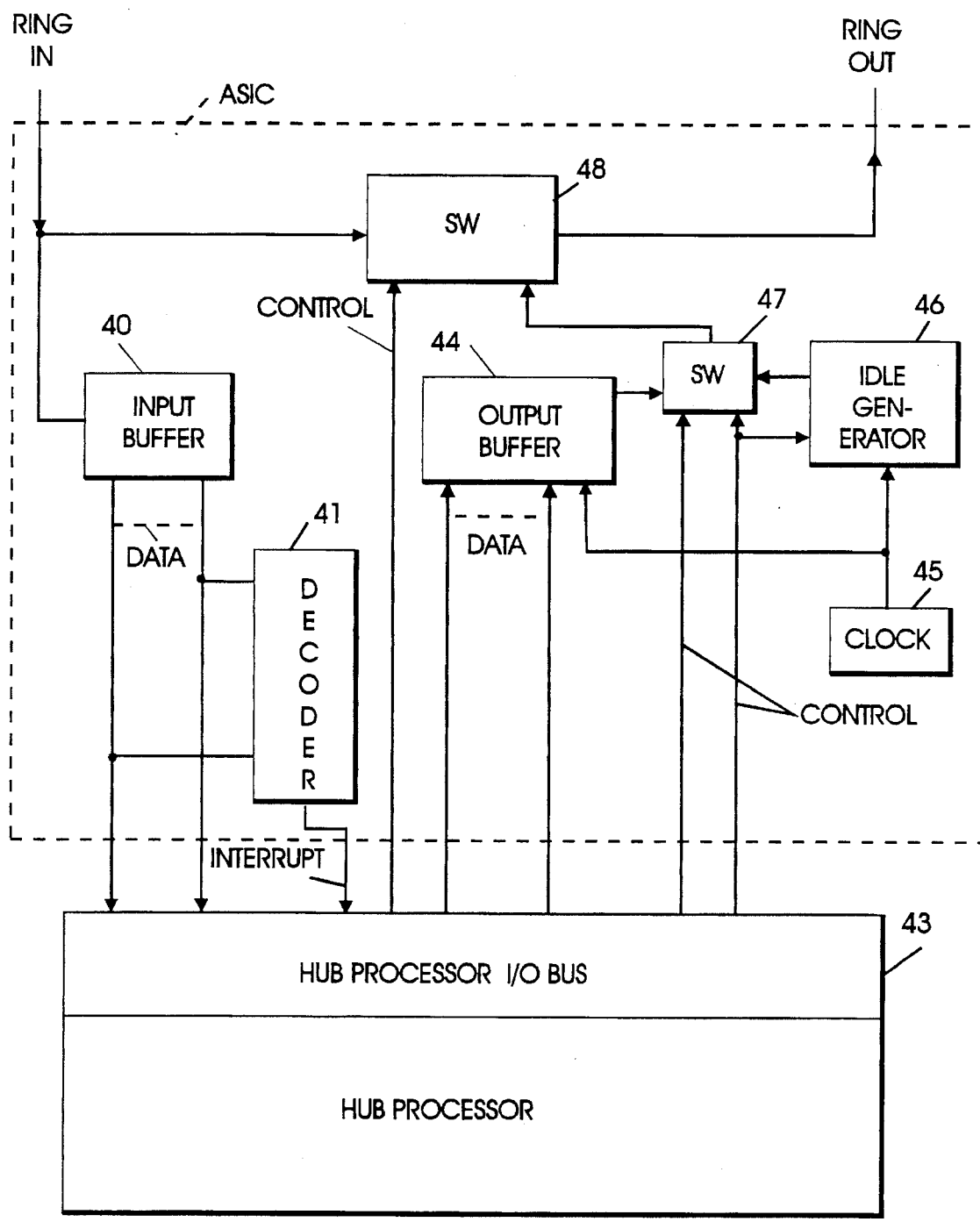

Each hub is provided with two ASIC devices in lieu of the three full adapters described and illustrated in the 962 patent cited above. During normal ring operation neither ASIC device is connected in the rings. Upon detecting a beacon frame from any source at a port the hub processor connects one of the ASIC devises ASIC-1 in the primary ring as illustrated in view A of FIG. 3 and the other ASIC-2 in the secondary ring also as shown in view A. The hub processor, as will be described in greater detail later in connection with the description of FIG. 4, causes ASIC-1 to transmit a beacon frame with unique hub address on the primary ring. Both ASIC-1 and ASIC-2 listen to their respective rings and interrupt the hub processor when they receive a MAC frame. The hub processor reads the received MAC frame(s) and makes a determination based on the content of where the fault resides.

If the fault is upstream on the primary ring, the processor switches to the configuration illustrated in view B and causes ASIC-1 to transmit a beacon frame with the unique hub address. If this MAC frame is received at ASIC-1 the fault has been bypassed by the reconfiguration and ASIC-1 can be removed since it is no longer necessary. ASIC-2 will be required to detect when the faulty portion of the ring recovers. However, this can be accomplished on a part time basis and both ASICs can be shared amongst a number of rings if they are served by the same hub thus further reducing the cost of the hub. If the fault is downstream the connection illustrated in view C is used and is similar in operation and function to that shown in view B described above.

If the hub program determines that the fault resides between the primary ring in and ring out, it switches to the configuration shown in view D. ASIC-1 under control of the hub processor transmits beacon frames while the processor executes different port configurations in an attempt to locate and eliminate the faulty component(s). Once this has been accomplished (ASIC-1 receives its own MAC beacon frame recognized by the hub processor) normal ring configuration is reestablished.

An ASIC device illustrated in block form (FIG. 4) includes an input buffer 40 for receiving serial signals from the ring. A decoder 41 connected to the parallel buffer output is designed to recognize one or more MAC frames. These may include, for example, beacons, claim token, ring purge, duplicate address test, idle, . . . etc. When one of the MAC frames is detected the decoder issues an interrupt to the hub processor 41 over the hub processor I/O bus 43.

At this time the hub processor reads the contents of the buffer and the hub program selects a recovery option which could include one or more of the steps described above in connection with the description of FIG. 3. It would load an appropriate MAC frame such as a beacon into an output buffer 44. Connect a clock 45 driven idle generator 46 to the ring via switches 47 and 48. After idle characters have been transmitted to establish synchronization on the ring the hub processor 42 would operate switch 47 to cause the MAC frame (a beacon frame) previously stored in buffer 44 to be repeatedly transmitted on the ring. At the same time the input buffer 40 is receiving signals over the ring. In this mode of operation switch 48 isolates the input of the buffer 40 from the output buffer 44. This isolation enables the hub processor to view the input from the ring to the buffer 40. If a reconfiguration causes a beacon MAC frame to be returned to and received in buffer 40 then the reconfiguration cured the failure and at least one of the ASIC devices can be used on another ring supported by the hub.

While only a single embodiment of the invention has been shown and described in detail it will be apparent to those skilled in this art that changes may be made in the invention without departing from the spirit and scope of the invention.

We claim:

1. In a serial communication network including at least one hub having a hub processor including an I/O bus, a plurality of station attachment ports, means at each port for detecting a unique media access control frame and for interrupting the hub processor upon detection of the media access control frame; a fault isolation device under control of the hub processor comprising:

an input buffer having a serial input connected to the serial communication network and having a parallel output connected to the I/O bus of the hub processor;

a decoding circuit connected to the parallel output of the input buffer for detecting at least one media access control frame when present on the serial network and for providing an interrupt signal to the hub processor over the I/O bus upon detection of the at least one media access control frame;

an output buffer having parallel inputs connected to said hub processor via said I/O bus for receiving a media access control frame from the hub processor and a serial output; and, means connected to the I/O bus and under control of the hub processor for transmitting the media access control frame stored in the output buffer via the output buffer serial output onto the serial network and for isolating the input buffer input from the output buffer output.

2. The fault isolation device set forth in claim 1 in which the serial network to which it is connected is a token ring network.

3. The fault isolation device set forth in claims 1 or 2 in which the means connected to the I/O bus and under control of the hub processor includes means for transmitting idle characters on the network before the transmission of the media access control frame stored in the output buffer.

4. The fault isolation device set forth in claim 3 in which the means connected to the I/O bus and under control of the hub processor for isolating the input buffer input from the output buffer output includes switching means connected in the network downstream of the input buffer connection to the network and controllable by the hub processor for interrupting the network path and for supplying idle and output buffer signals to the downstream network to there by isolate the input of the input buffer from the output of the output buffer.

5. The fault isolation device set forth in claims 1 or 2 in which the means connected to the I/O bus and under control of the hub processor includes:

a first switch means connected in the network downstream of the input buffer connection to the network and controllable by the hub processor for interrupting the network path and establishing an alternate connection to the network;

an idle character generator; and, second switch means under control of the hub processor for selectively connecting the idle generator and the output of the output buffer to the alternate connection of the first switch means.

* * * * *